1,813,626

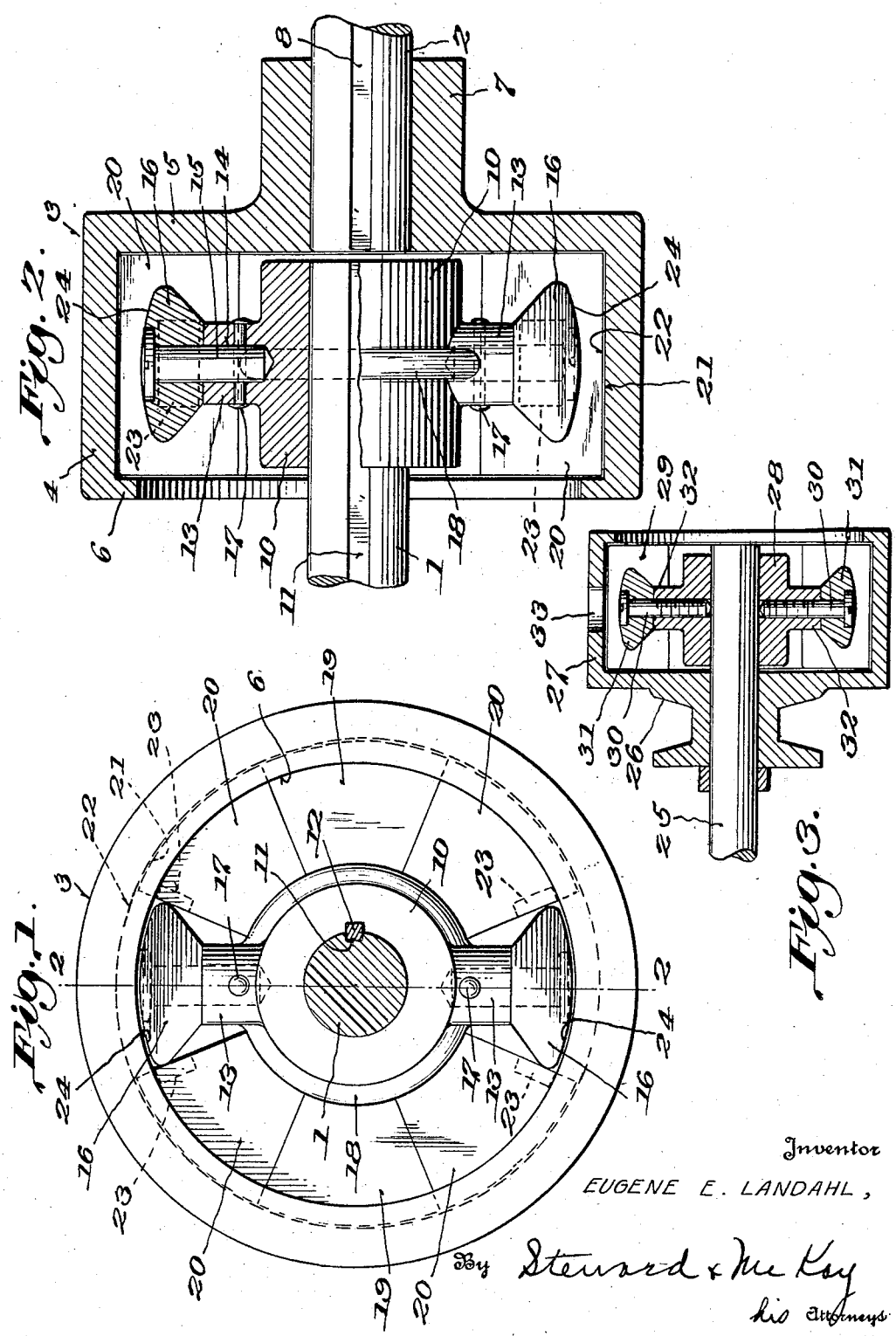
July 7, 1931.  E. E. LANDAHL  1,813,626
FRICTION CLUTCH
Filed Aug. 14, 1929
Inventor
EUGENE E. LANDAHL,
By Steward & McKay
his Attorneys Patented July 7, 1931

UNITED STATES PATENT OFFICE

EUGENE E. LANDAHL, OF FAIRMONT, WEST VIRGINIA

FRICTION CLUTCH

Application filed August 14, 1929. Serial No. 385,816.

The present invention relates to friction clutches of the type operable to connect a rotatable driving member with a rotatable driven member through frictional engagement of the parts upon the attainment of a given speed.

The invention has as its chief object, the provision of a flexible centrifugal friction clutch coupling which will operate to connect the driving and driven members notwithstanding the fact that they may be out of axial alinement or that one of them wabbles or moves transversely relative to the other.

Another object is the provision of means whereby relative axial movement between the driving and driven members is permitted independently of any movement of the frictional engaging surface, without varying the clutching force and with minimum frictional resistance to such relative axial movement.

The attainment of the above two objects results in the provision of a flexible friction coupling permitting a considerable amount of misalignment and axial reciprocation of the driving or motor shaft without affecting the clutching force.

A further object is the provision of a friction clutch of the above type that is compact and small in proportion to the power to be transmitted therethrough, simple and sturdy in structure, and capable of being readily installed.

Other objects and advantages of the invention will be apparent from the following description taken in connection with the accompanying drawings which illustrate one practical form of apparatus embodying the invention, it being understood that the description of this particular embodiment is merely descriptive and not restrictive.

In the drawings:

Fig. 1 is an end view of the clutch device looking at the driving end.

Fig. 2 is a sectional view taken on the line 2—2 of Fig. 1 but with the lower half of the driving member in full.

Fig. 3 is a longitudinal sectional view of a modification taken along the axis.

Referring to the drawings in detail, and first to Figs. 1 and 2, the numeral 1 indicates a primary driving shaft which may be that of a prime mover such as an electric motor, and 2 indicates a shaft to be driven. The driven clutch member 3 is in the form of a short cylindrical housing or casing, of cast iron or the like, having a cylindrical side wall 4, an end wall 5 and an annular front retaining flange 6 extending radially inward from the cylindrical side wall 4, the end wall 5 being provided with a hub 7 whereby the driven member is mounted on the driven shaft 2. The hub 7 is fixed on the shaft 2 in any known or other suitable manner as by a tapered keyway 8 and driven tapered key, not shown.

Mounted on the driving shaft 1 and situated within the casing 3 is a driving member or spider in the form of a hub 10 fixed to the shaft 1 as by means of a tapered key-way 11, and driven tapered key 12. Radial arms or extensions 13 are formed on diametrically opposite sides of the driving hub 10, each bored to form a socket 14. A headed stub shaft 15, carrying a roller 16 journaled thereon, is fitted in each of the bores or sockets 14 and secured therein, in the example illustrated, by means of anchor pin 17 passed through the extensions 13 and stub shafts 15, said anchor pins being headed at their ends as shown to hold them in place. Extending around each side of the driving hub between the radial extensions 13 and in an arc concentric with the hub, are rounded supporting ribs 18, the purpose of which will be explained hereafter.

Situated within the casing 3 between its cylindrical wall 4 and the driving hub 10, is an assemblage of intermediate clutching members in the form of sector-shaped friction blocks 19 and 20, arranged in two groups of three, one on each side of the driving hub, loosely held in place radially by the supporting ribs 18 and the inner surface of the cylindrical wall 4 of the casing, and loosely held axially between the end-wall 5 and the flange 6. These friction blocks are preferably made of a material softer than that of the casing, such as Babbitt metal, and are formed with an outer surface or periphery in the form of an arc 21 of the same radius as the inner cylindrical surface 22 of the wall 4 of the casing, the surfaces 21—22 constituting complementary frictional, clutching surfaces. The several blocks 19—20 are all of substantially the same shape and size and of such angular dimension that each group of three will extend the whole angular distance on one side of the driving hub between the rollers 16 with the end blocks 20 in contact or nearly in contact with the rollers. This contact of a block 20 with one of the rollers takes place, as shown, on a portion of the radial face of the block adjacent the roller at which point the block is provided with a bearing plate in the form of a hardened steel plate insert 23 of sufficient area to contact with the roller throughout considerable relative movement between the block and the roller. This relative movement is necessarily partly radial due to radial movement of the friction block into and out of engagement with the movable casing wall 4, and may be partly through an arc or curve along the surface of the bearing plate due to a relative rocking motion between the driving and driven parts caused by misalignment or angular displacement of the driving and driven shafts, and partly along a line parallel to the axis of the driving hub due to reciprocation or end play in the driving shaft which defect is present in more or less degree in most all motors, especially electric motors.

To facilitate assembling, the outer ends 24 of the rollers are each formed with a curved surface and the distance from end to end of the rollers made such in proportion to the opening through the flange 6 that the assemblage of the driving hub and rollers may be slid into the casing 3 along its axis after the friction blocks 19—20 have been positioned in the casing in two groups as shown. It will be clear that with the driving hub and rollers removed, the friction blocks may be readily removed and replaced, ample room being supplied by the space normally occupied by the driving hub with its rollers and the supporting ribs 18. The ribs 18 being half round or curved in cross-section, act as cams during the insertion of the hub to move into place any of the blocks that may be displaced inwardly.

In operation, assuming the shafts 1 and 2 to be substantially horizontal, when the parts are stationary, those friction blocks which are above the axis of the driving hub rest on the ribs 18 of the hub while those below rest on the inner surface of the wall 4 of the casing 3. Upon rotation of the shaft 1 and driving hub 10, say in a clockwise direction (Fig. 1), the impelling rollers 16 bear against the bearing plates 23 of the two friction blocks 20 which are in lead of the rollers, pushing the blocks 19—20 around within the casing 3. As the speed increases, the blocks are forced radially outward by centrifugal force against the inner surface of the casing wall 4 with increasing force, the blocks first slipping until the casing starts to rotate, then slipping less and less as the casing attains the speed of the blocks until the casing and driving hub rotate in unison, the casing carrying with it the driven shaft 2. Any sudden strains, variation of the load or sudden stopping of the motor driving the shaft 1, will result in slipping of the friction blocks to relieve strain on any machinery connected with the clutch.

During operation of the clutch in shipped or engaged position any relative axial movement of the driving hub caused by end play in either shaft, or a rocking movement thereof as in a universal joint caused by misalignment of the shafts, will be permitted with substantially no strain and a minimum of friction by the friction reducing action of the rollers turning on their stub shafts 15 in response to such movements. As such movements are repeated for each revolution of the driving shaft and occur during the exertion of maximum pressure between the relatively moving parts, it is important that the impelling rollers 16 be arranged as shown to take up the friction by rotation on their shafts. On the other hand, the radial movement between the blocks 20 and the rollers, due to the movement of the blocks into and out of engagement with the casing wall 4, takes place only upon shipping and unshipping of the clutch and at a time when the pressure between the roller and blocks is just sufficient to move the blocks around while out of clutched position. As soon as the blocks have moved into contact with the cylindrical wall of the casing, this relative radial movement ceases and it is therefore of little importance whether the small amount of friction and wear incident thereto be reduced other than that reduction afforded by the smooth hardened steel bearing plates 23 and the smooth rounded engaging portions of the impelling rollers 16 also preferably of hardened steel.

The modification shown in Fig. 3 is especially adapted for driving a pulley loosely mounted on the driving shaft. Here the driving shaft is indicated at 25 on which is loosely mounted the driven pulley 26 forming the hub of the short cylindrical casing 27 having the same form and function as the casing 3 of Fig. 1. Within the casing 27 are mounted the driving hub 28 and sector-shaped friction blocks 29 in a manner similar in all respects to that of Figs. 1 and 2, except that the stub shafts 30 for the rollers 31 take the form of flat headed bolts passed through the radial projections 32 to the center of the driving hub in threaded engagement therewith, an aperture 33 being provided in the cylindrical wall of the casing to admit a screw driver or like instrument for the purpose of screwing the pins or bolts 30 into engagement with the driving shaft 25 after the driving hub has been slid along the shaft into place in the casing. The threaded stub shafts or bolts 30 thus serve as set screws to hold the driving hub fixed on the shaft which hub in turn acts as a stop collar to hold the pulley against axial displacement.

It will be understood that the invention is not limited to the exact arrangements shown and described and that various modifications can be made without departing from the spirit and scope of the broad invention as defined in the claims.

What is claimed is:

1. A friction clutch comprising a driving member, a driven member, means driven by said driving member arranged to frictionally engage said driven member under centrifugal force, and a connection between said driving member and said means arranged to transmit rotation of said driving member to said means, said connection including a member turnable on an axis extending radially of said driving member.

2. A friction clutch comprising a rotary driving hub, a rotary driven member in the form of a casing surrounding the hub and having a wall with an inner cylindrical friction surface, friction blocks mounted to travel loosely around within said driven member between the cylindrical friction surface and the hub, and rollers carried by said hub each arranged to rotate on an axis arranged radially of the hub and to bear against a substantially radially extending surface on one of said blocks.

3. A friction clutch comprising a rotary driving hub, a rotary driven member in the form of a casing surrounding the hub and having an annular wall with an inner annular friction surface, a plurality of sector shaped friction blocks mounted to travel loosely around within said driven member between the annular friction surface and the hub, and a plurality of rollers less in number than the number of friction blocks, each arranged to rotate on an axis arranged substantially radially of the hub and to bear against a radially extending surface on one of said blocks.

4. A friction clutch comprising a rotary driving hub, a rotary driven member in the form of a casing surrounding the hub and having an inner cylindrical friction surface, a radially extending end wall and a retaining flange extending radially inward from the cylindrical friction surface, friction blocks arranged to travel loosely around within the driven member between the cylindrical friction surface and the hub and held within the driven member by the end wall and the retaining flange, and rollers mounted on said hub each arranged to rotate on an axis radial of said hub and to bear radially of their axes each against a surface on one of said blocks extending substantially radially of the hub.

5. A friction clutch coupling comprising a rotary driving member, a driven member, intermediate friction elements arranged to move into frictional engagement with said driven member under centrifugal force, and a member carried by said driving member and rotatable on an axis extending radially thereof to transmit rotation of said driving member to said friction elements, said driving member and said friction elements being arranged to move freely in relation to each other in the direction of their axis of rotation.

6. A centrifugal clutch for coupling a driving shaft with a member to be driven, comprising a cylindrical casing secured to the member to be driven and having an inside cylindrical friction surface, a driving hub mounted on the shaft within the casing concentric with the said inside friction surface, a pair of stub-shafts passing radially through the driving hub in threaded engagement therewith and into engagement with the driving shaft to secure the hub to the shaft, a pair of impelling rollers mounted one on each of the stub-shafts, and friction blocks loosely fitted within the casing between the inside cylindrical friction surface and the driving hub in the path of the impelling rollers so as to be impelled thereby around the axis of the hub within the casing.

7. A friction clutch comprising a rotary driving member, a rotary driven member, a friction element arranged between said members and movable by centrifugal force into frictional engagement with said driven member, and means rotatable on an axis extending radially of said driving member to transmit the rotation of said driving member to said element.

In testimony whereof I hereunto affix my signature.

EUGENE E. LANDAHL.